United States Patent
Jung et al.

(10) Patent No.: US 11,872,509 B2
(45) Date of Patent: Jan. 16, 2024

(54) FINE PARTICLE SEPARATING APPARATUS

(71) Applicant: RESEARCH COOPERATION FOUNDATION OF YEUNGNAM UNIVERSITY, Gyeongsangbuk-do (KR)

(72) Inventors: Jin Young Jung, Daegu (KR); Byeong Jun Lee, Daegu (KR)

(73) Assignee: RESEARCH COOPERATION FOUNDATION OF YEUNGNAM UNIVERSITY, Gyeongsangbuk-do (KR)

( * ) Notice: Subject to any disclaimer, the term of this patent is extended or adjusted under 35 U.S.C. 154(b) by 964 days.

(21) Appl. No.: 16/651,849

(22) PCT Filed: Sep. 27, 2018

(86) PCT No.: PCT/KR2018/011376
§ 371 (c)(1),
(2) Date: Mar. 27, 2020

(87) PCT Pub. No.: WO2019/066463
PCT Pub. Date: Apr. 4, 2019

(65) Prior Publication Data
US 2020/0246732 A1    Aug. 6, 2020

(30) Foreign Application Priority Data
Sep. 29, 2017 (KR) .......................... 10-2017-0127956

(51) Int. Cl.
*B01D 33/15* (2006.01)
*B01D 33/46* (2006.01)
(Continued)

(52) U.S. Cl.
CPC ............. *B01D 33/15* (2013.01); *B01D 33/41* (2013.01); *B01D 33/461* (2013.01);
(Continued)

(58) Field of Classification Search
CPC ...... B01D 33/15; B01D 33/41; B01D 33/461; B01D 33/466; B01D 36/00; B01D 33/13;
(Continued)

(56) References Cited

U.S. PATENT DOCUMENTS 3,542,197 A * 11/1970 Rosaen ................ B01D 29/663
210/120
4,151,086 A * 4/1979 Brooks .................... G01N 1/14
73/714
(Continued)

FOREIGN PATENT DOCUMENTS

GB      2294887 A  *  5/1996  .......... B01D 29/118
JP      58-106398 A     6/1983
(Continued)

*Primary Examiner* — Joseph W Drodge
(74) *Attorney, Agent, or Firm* — Seed IP Law Group LLP

(57) ABSTRACT

A fine particle separating apparatus includes a first filter having a first mesh, the first filter having a first section and a second section with the first mesh therebetween and rotatably mounted in the first filter part. A first flow path allows sludge to flow into the first filter, a second flow path allows an effluent from the first filter party to flow therein, and a third flow path is provided to discharge the effluent from the second flow path to the outside. At least a portion of the effluent flowing into the second flow path is provided to the first filter part in a fluid loop along a fourth flow path, and a fifth flow path is defined in the first section to allow the effluent from the fourth flow path to pass through the first filter part. A storage tank and a pump are also provided.

19 Claims, 14 Drawing Sheets

(51) Int. Cl.
  *G01N 1/14* (2006.01)
  *B01D 36/00* (2006.01)
  *B01D 33/41* (2006.01)

(52) U.S. Cl.
  CPC .......... *B01D 33/466* (2013.01); *B01D 36/00* (2013.01); *G01N 1/14* (2013.01)

(58) Field of Classification Search
  CPC ........ B01D 33/70; B01D 33/74; B01D 63/16; B01D 29/62; B01D 29/66; B01D 33/455; B01D 29/50; B01D 29/56; B01D 29/88; B01D 29/90; B01D 29/92; B01D 33/155; B01D 33/76; B01D 36/02; B01D 2201/32; B01D 2201/583; C02F 1/066; C02F 1/40; C02F 2103/007; C02F 2301/04; C02F 2301/043; C02F 1/001; G01N 1/14; G01N 2001/205
  USPC .................................. 210/391, 393, 396, 397
  See application file for complete search history.

(56) References Cited

U.S. PATENT DOCUMENTS

| | | | | |
|---|---|---|---|---|
| 4,584,099 A | * | 4/1986 | Burton | B01D 29/56 210/485 |
| 11,052,429 B2 | * | 7/2021 | Jung | C02F 3/12 |
| 2002/0166821 A1 | * | 11/2002 | Flanagan | B01D 33/60 210/402 |
| 2011/0253613 A1 | * | 10/2011 | St. Germain | C02F 1/004 210/195.3 |
| 2013/0193056 A1 | | 8/2013 | Tashiro | |
| 2015/0224429 A1 | * | 8/2015 | Massignani | B01D 33/463 210/247 |

FOREIGN PATENT DOCUMENTS

| | | |
|---|---|---|
| JP | 2-251299 A | 10/1990 |
| JP | 7-313990 A | 12/1995 |
| KR | 10-2013-0069826 A | 6/2013 |
| KR | 10-2013-0128602 A | 11/2013 |
| KR | 20160083562 A * | 7/2016 |

* cited by examiner

[FIG. 1]
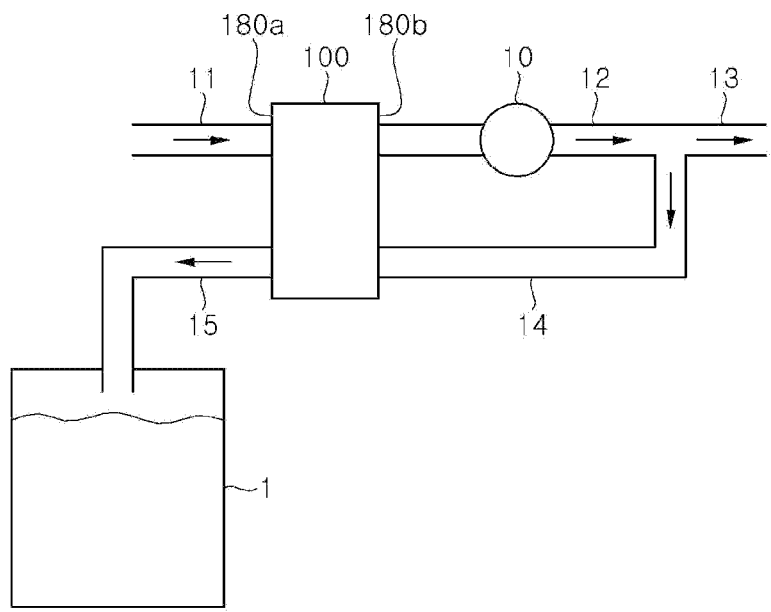
[FIG. 2]
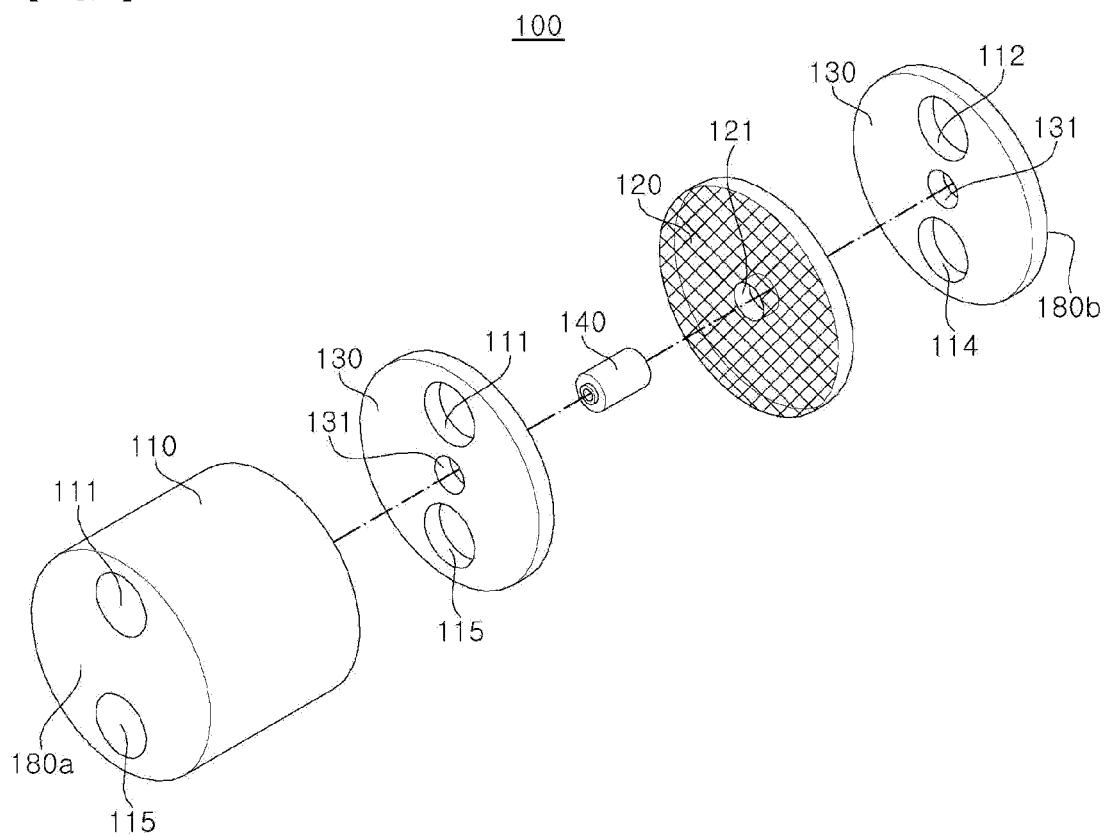

[FIG. 3]
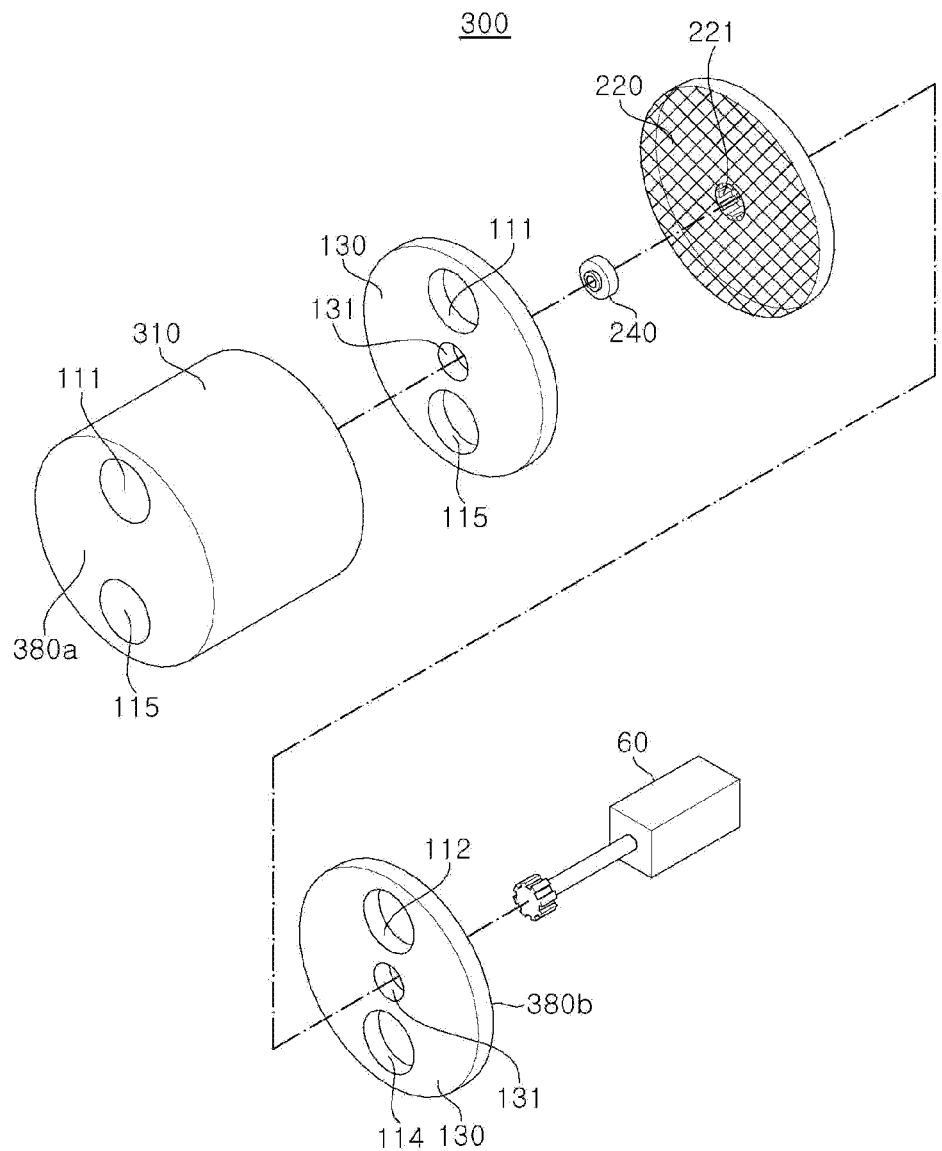

[FIG. 4]
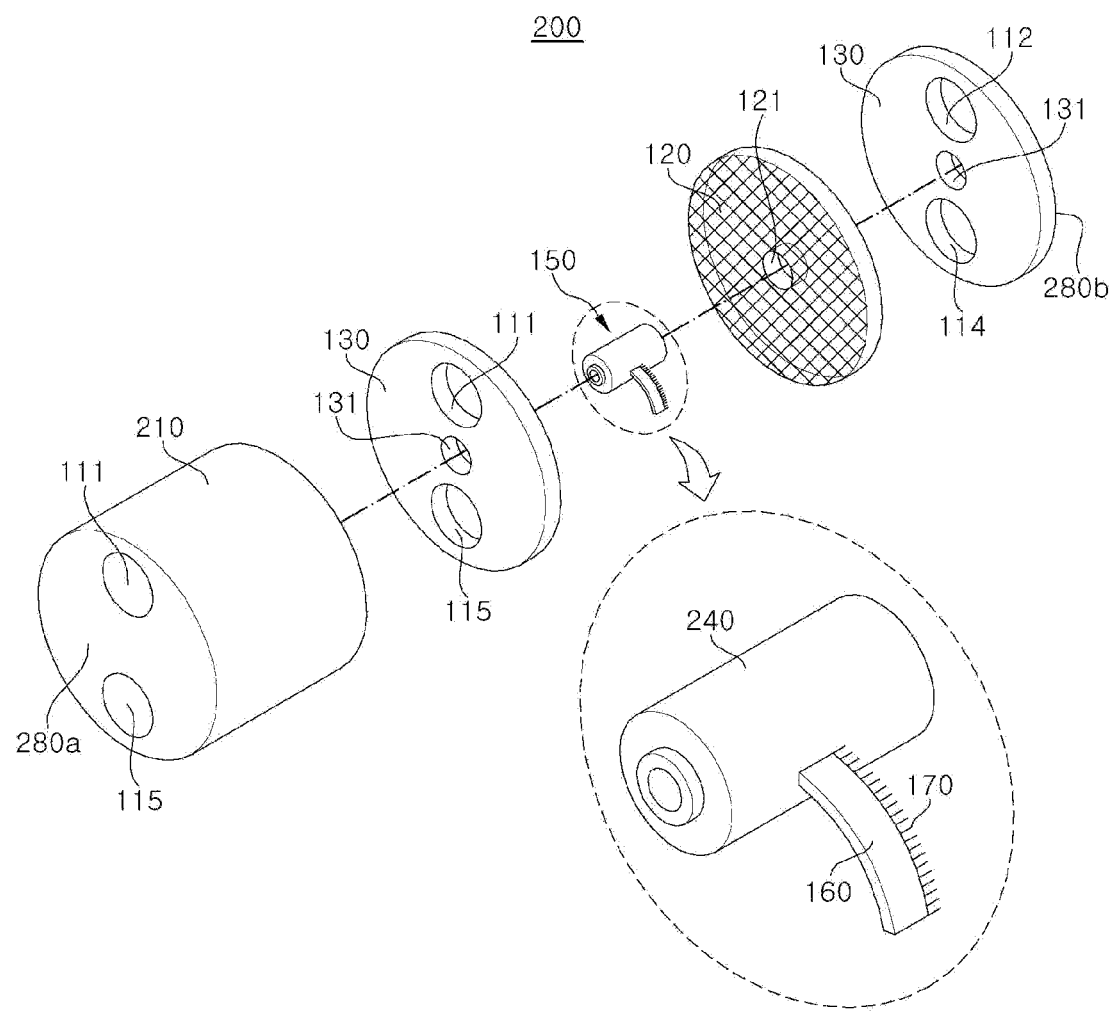

[FIG. 5]
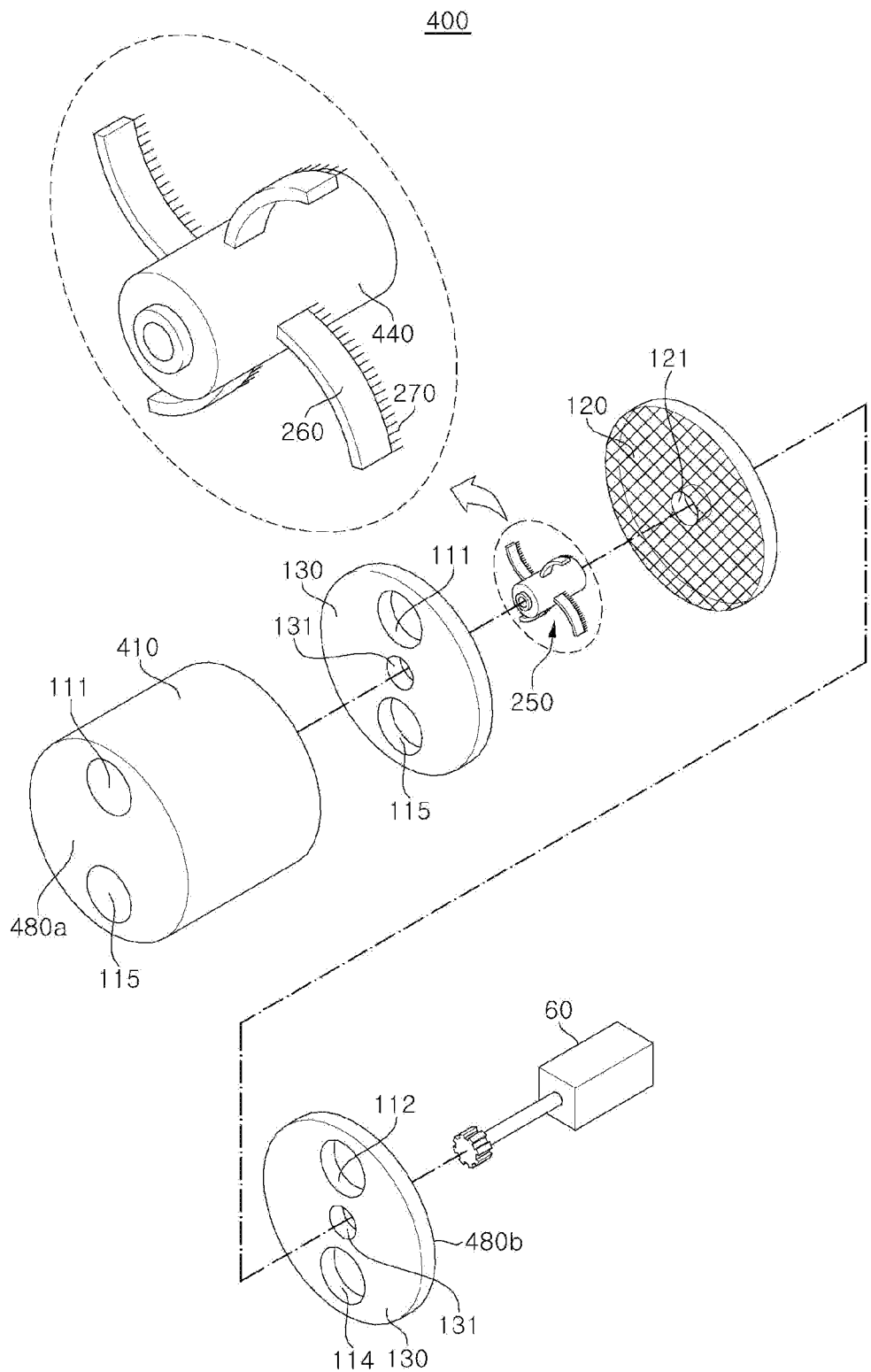

[FIG. 6]
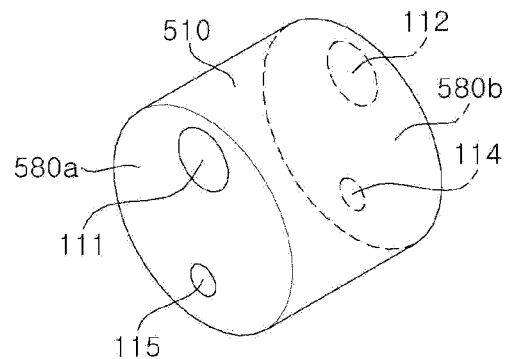
[FIG. 7]
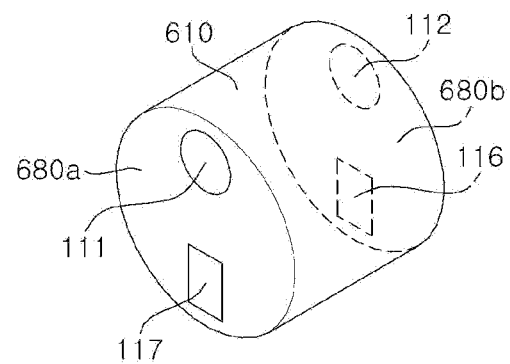

[FIG. 8]
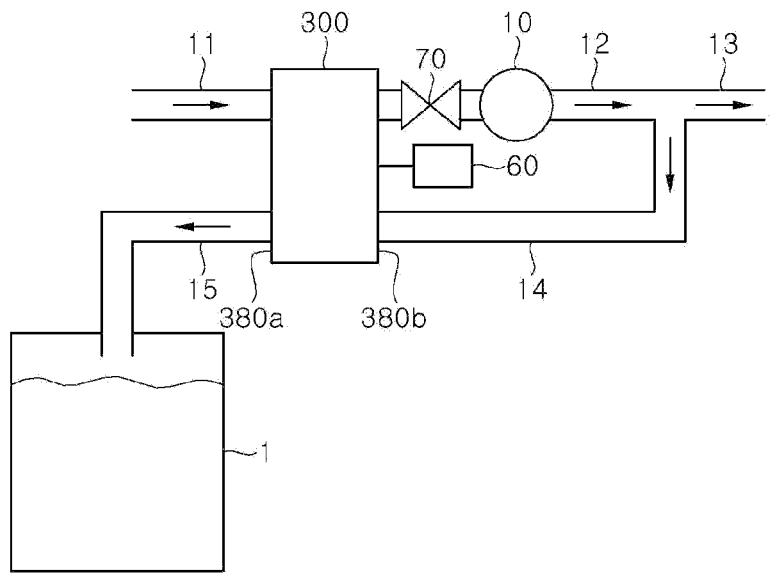
[FIG. 9]
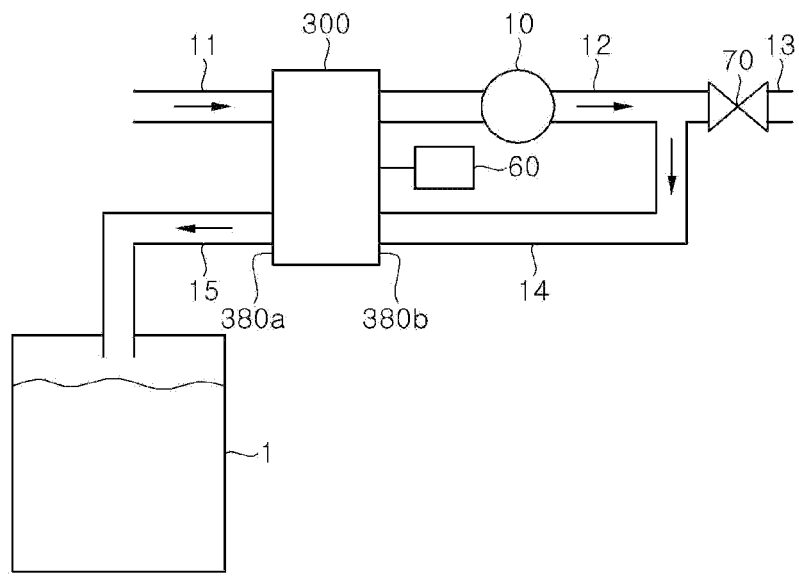

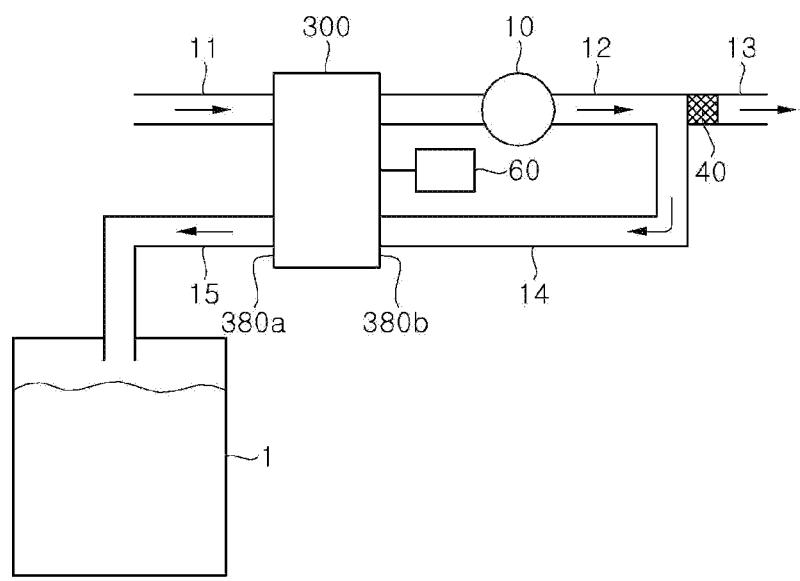
[FIG. 10]

[FIG. 11]
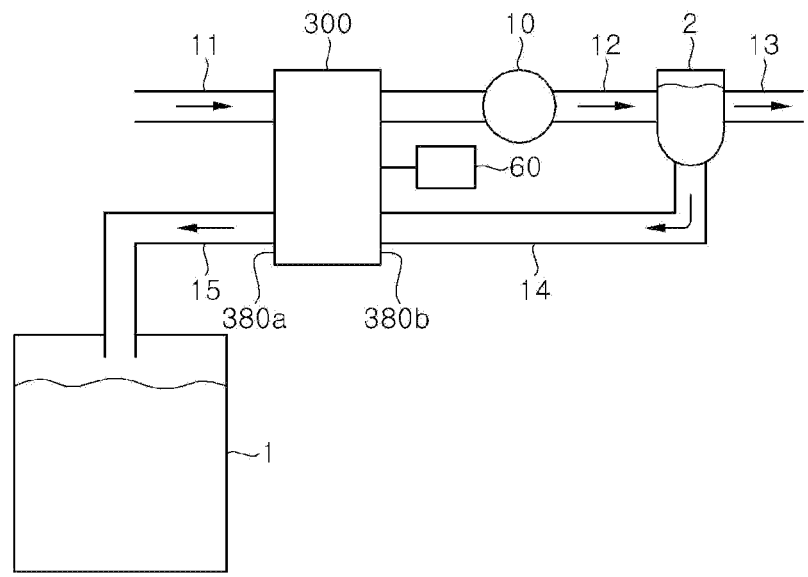
[FIG. 12]
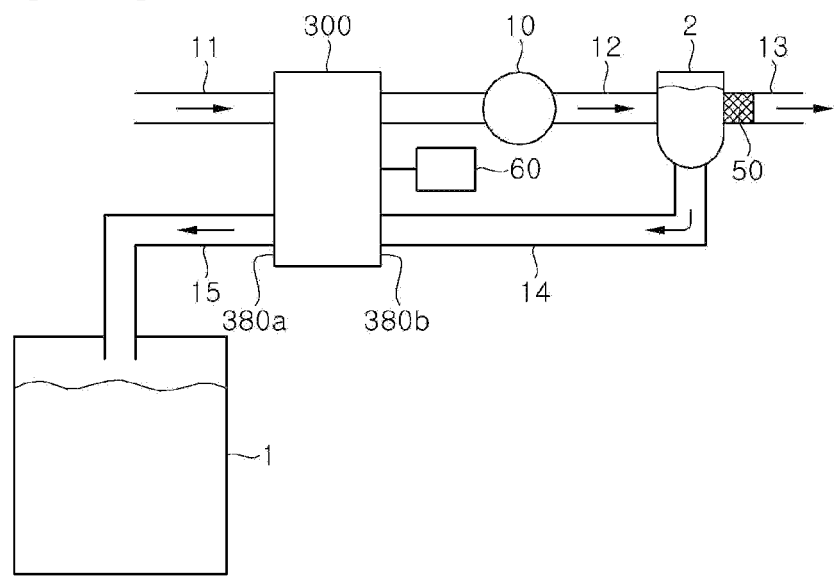

[FIG. 13]
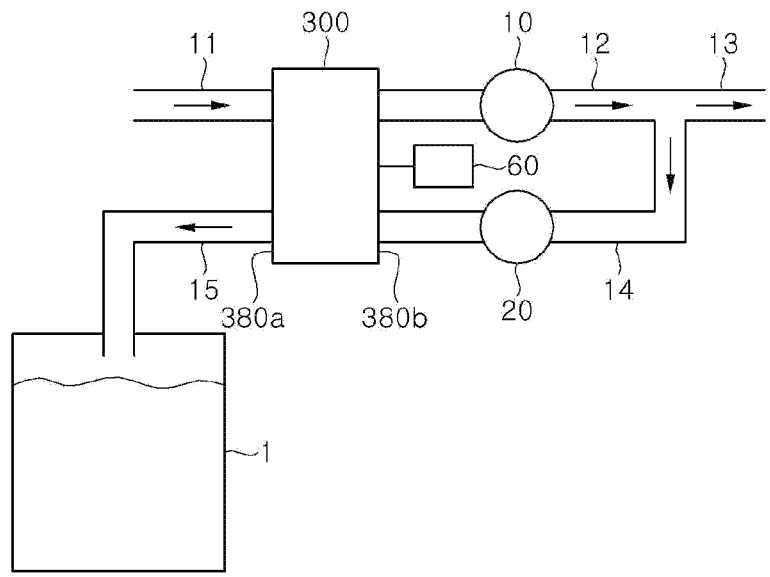
[FIG. 14]
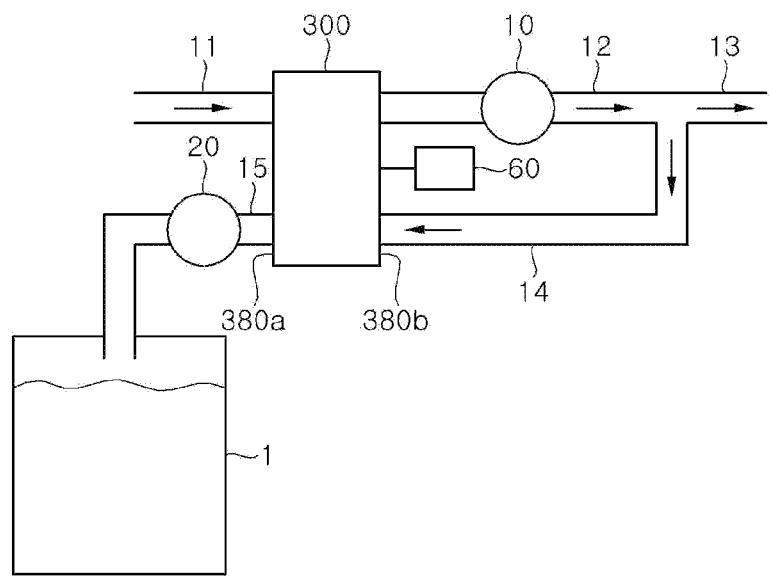

[FIG. 15]
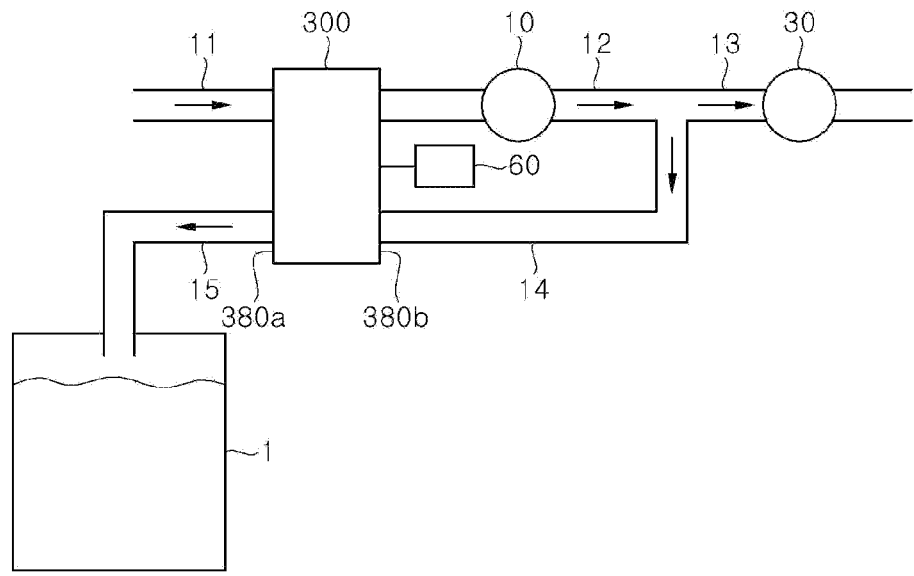
[FIG. 16]
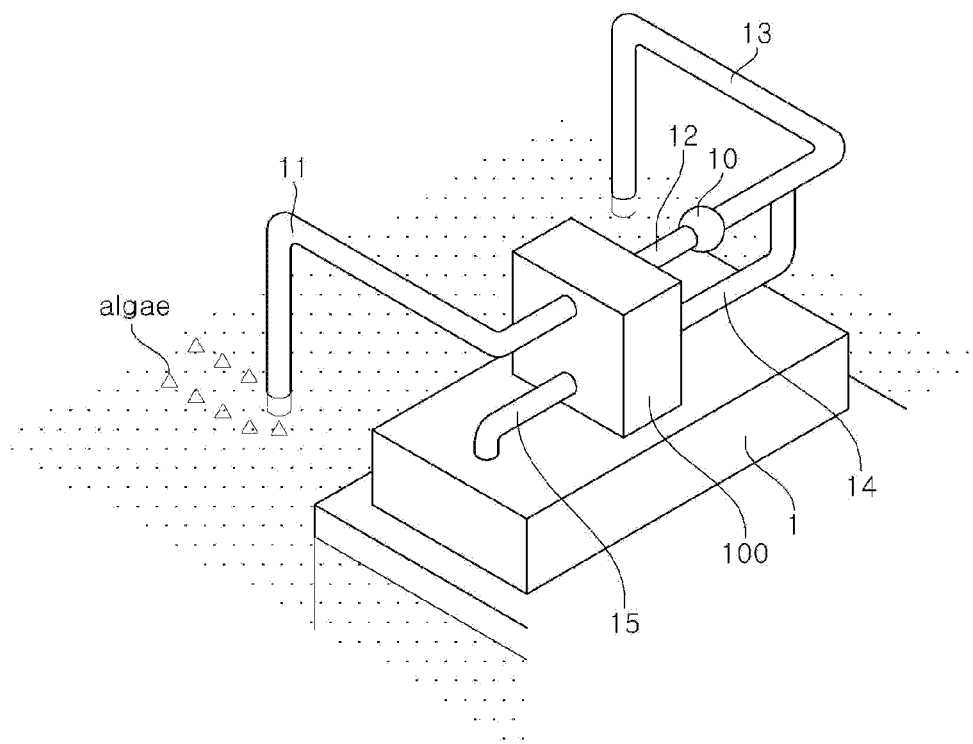

[FIG. 17]
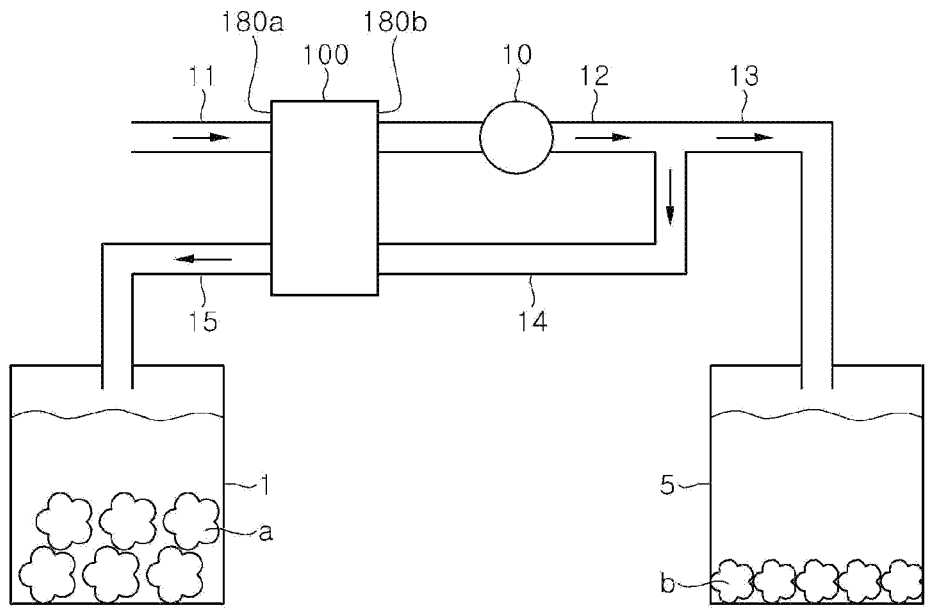
[FIG. 18]
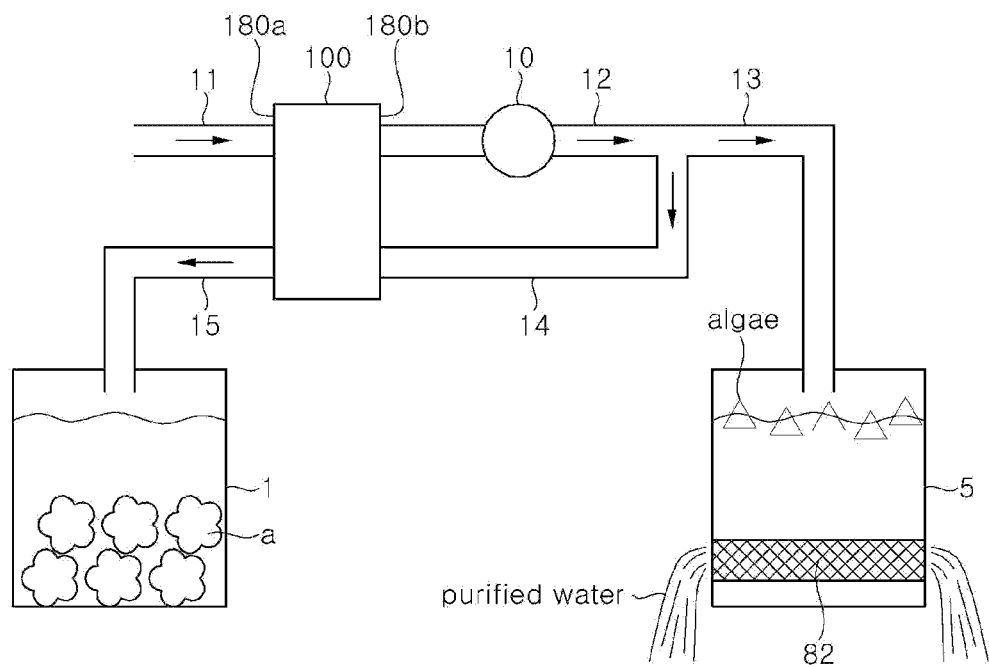

[FIG. 19]
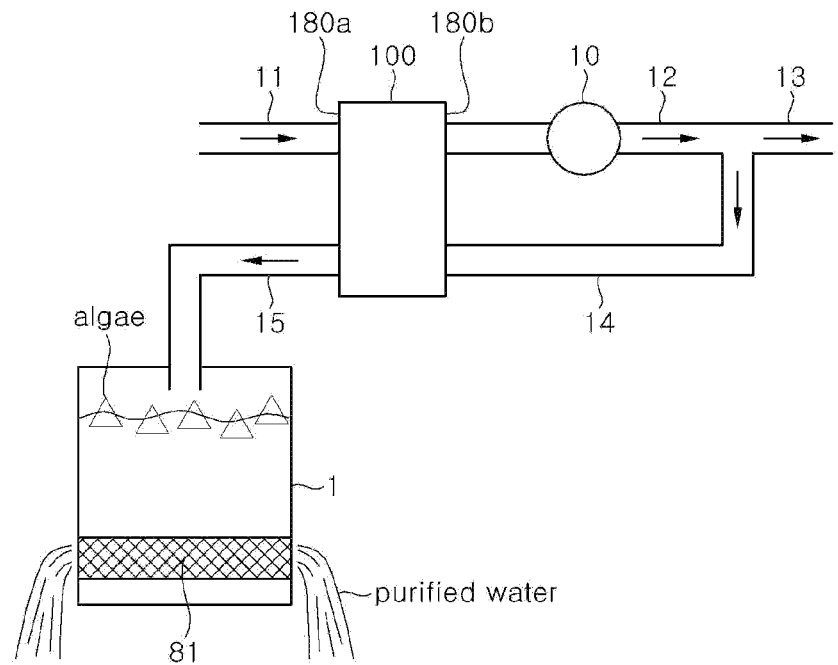
[FIG. 20]
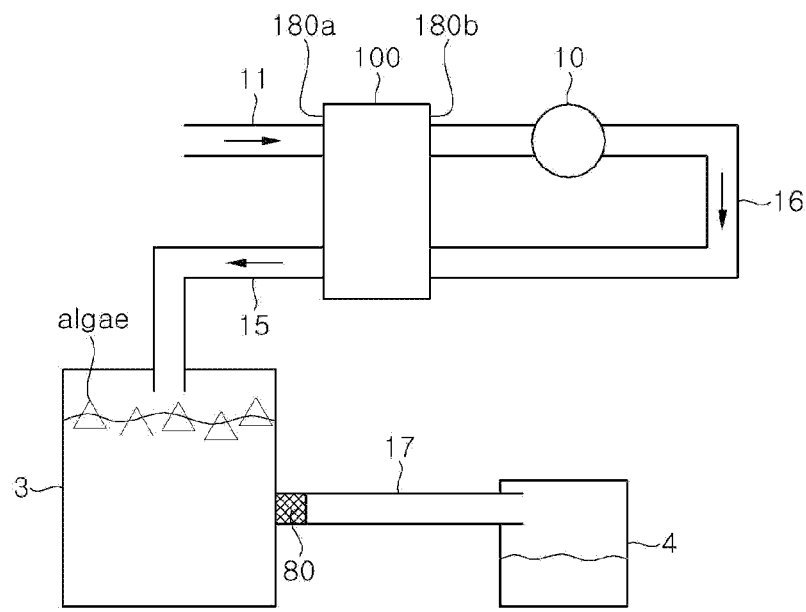

[FIG. 21]
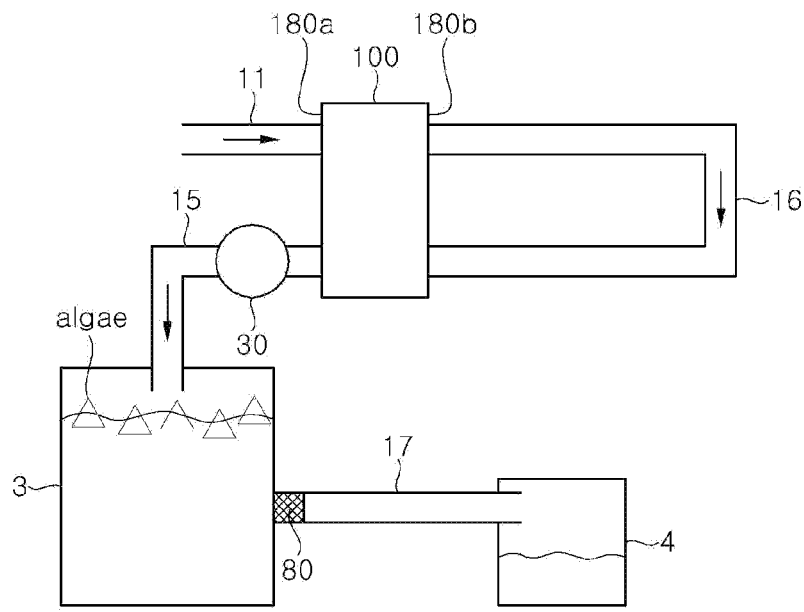
[FIG. 22]
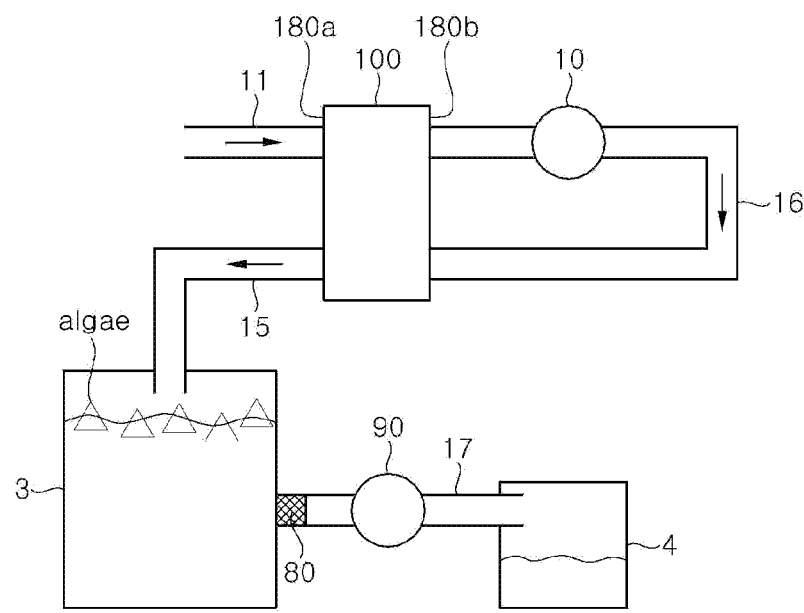

[FIG. 23]
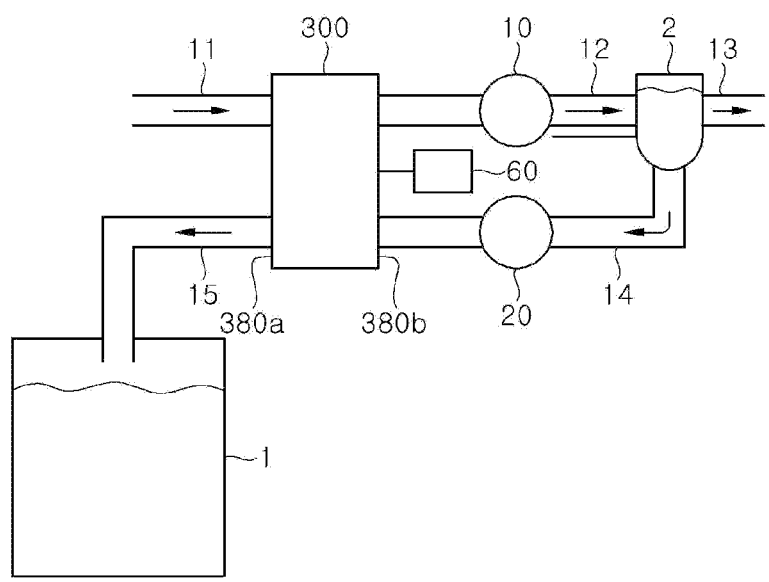

FINE PARTICLE SEPARATING APPARATUS

BACKGROUND

Technical Field

The present invention relates to a fine particle separating apparatus, and, more particularly, to a fine particle separating apparatus capable of separating fine particles of various sizes, which are present in a river and the like.

Description of the Related Art

In general, water pollution refers to a condition in which water in a water body becomes unsuitable for its intended use as the amount of pollutants released to the water body is beyond the self-purification capacity of the water body. Water pollution due to inflow of organic materials matters little, whereas risks from eutrophication and toxic substances have emerged as social issues. Among various types of environmental pollution, the most frequent and important issue is deterioration in water quality in water supply sources.

Eutrophication is a phenomenon that occurs as inflow of nutrient salts in domestic sewage, industrial wastewater, and livestock waste into a water system increases and specific species of algae proliferate and form a mass on the surface of the water. During eutrophication, water in the water system is supersaturated with oxygen dissolved in surface layers thereof by photosynthesis of a large amount of blue-green algae during the daytime, and transparency of the water significantly decreases to 1.5 m or less.

Here, algae are organisms that are not differentiated into roots, stems, and leaves and do not have vascular bundles used as a pathway for metabolites, such as xylem and phloem, despite containing chlorophyll-a and performing photosynthesis in the same way that plants do. Algae are classified by size into microalgae, which are single-celled and are observable under a microscope, and macroalgae, which are multi-celled and are observable with the naked eye, wherein microalgae are also called phytoplankton. Microalgae have various shapes and are complex to classify, as compared with organisms belonging to other taxa, and thus are not easily generalized. Microalgae are known to have a size or length of 10 µm.

On the other hand, according to phylogenetic criteria, algae are classified into: blue-green algae (cyanobacteria), which are prokaryotes, lacking a distinct membrane-bound nucleus; and algae belonging to eukaryotes, containing a distinct membrane-bound nucleus. Blue-green algae are known to cause various environmental problems by creating water blooms in eutrophic lakes and rivers. In addition, blue-green algae cause various problems, including a risk to safety of drinking water sources due to toxins thereof and the death of other aquatic organisms due to depletion of oxygen caused by death thereof.

As phytoplankton, that is, a mass of algae, proliferates, the color of water changes. In freshwater bodies, this phenomenon is variously called algal bloom, water bloom, or green tide.

As described above, species of algae causing most green tides include *Microcystis, Anabaena*, and *Oscillatoria* and belong to blue-green algae, which are taxonomically prokaryotes. These species cause various environmental problems, such as forming into a mass on the surface of water, causing taste and odor in drinking water, and blocking precipitated sand in a water purification plant.

Occurrence of algae in a lake due to eutrophication causes water pollution in the lake. Moreover, over time, dead algae settle to the bottom of the lake, decay, release total phosphorus (TP) into the lake, and rise again to the water surface with rising water temperature, causing permanent eutrophication.

In Korea, a short-term method in which yellow soil is spread on microalgae to sink the microalgae out of sight has mainly been used. However, this method is less effective in sinking green-tide algae occurring in freshwater systems than in sinking red-tide algae occurring in seawater bodies.

In order to overcome such a problem, various apparatuses and methods have been developed. For example, Korean Patent Laid-open Publication No. 2010-0091053 (published on Aug. 18, 2010) discloses a water quality improvement apparatus of stagnant water and Korean Patent Laid-open Publication No. 10-2017-0030353 (published on Mar. 17, 2017) discloses a water circulation system for removing water bloom.

However, the former has a problem of difficulty in thoroughly removing water pollutants, and the latter has a problem of lacking a means to remove water pollutants which fill a water treatment agent, such as silicate, during the removal process.

In addition, both the former and the latter have a problem in that water pollutants, such as green algae, are likely to stick to a propeller of a pump or to a power source, causing non-uniform rotation and malfunction thereof.

Accordingly, there is a need for a pump system which can thoroughly remove water pollutants such as green algae while allowing long-term operation of a green tide removal apparatus and prevention of damage to the apparatus due to the water pollutants.

BRIEF SUMMARY

Technical Problem

The present invention is aimed at providing a fine particle separating apparatus that includes a filter including a rotary mesh and having two regions with the mesh placed therebetween, in which the two regions are provided with a flow path allowing an effluent to flow into the filter therethrough and a flow path receiving the effluent having passed through the filter, respectively, thereby preventing the mesh from being clogged by fine particles and thus allowing continuous operation without interruption for cleaning purposes.

In addition, the present invention is aimed at providing a fine particle separating apparatus that includes a filter including a mesh and a blade assembly, at least a portion of which is rotatably mounted on the mesh, the filter having two regions with the mesh placed therebetween, in which the two regions are provided with a flow path allowing an effluent to flow into the filter therethrough and a flow path receiving the effluent having passed through the filter, respectively, thereby preventing the mesh from being clogged by fine particles and thus allowing continuous operation without interruption for cleaning purposes.

Technical Solution

It is one aspect of the present invention to provide a fine particle separating apparatus that can selectively separate fine particles present in rivers and the like in mixed form while preventing a mesh from being clogged by the fine particles and thus allowing continuous operation thereof.

In accordance with one aspect of the present invention, a fine particle separating apparatus includes: a first filter including a first mesh separating fine particles contained in sludge according to size, the first filter having a first region and a second region with the first mesh placed therebetween; a first flow path mounted in the first region to allow the sludge to flow into the first filter therethrough; a second flow path mounted in the second region to receive an effluent having passed through the first filter; a third flow path connected to the second flow path to discharge the effluent from the fine particle separating apparatus therethrough; a fourth flow path connected to one side of the second flow path and mounted in the second region to allow at least a portion of the effluent flowing into the second flow path to flow into the first filter therethrough; a fifth flow path mounted in the first region to receive the effluent discharged from the fourth flow and having passed through the first filter; a reservoir receiving the effluent discharged from the fifth flow path; and a first pump creating a flow of the effluent, wherein the first mesh is rotatably mounted on the first filter.

In accordance with another aspect of the present invention, a fine particle separating apparatus includes: a first filter including a first mesh separating fine particles contained in sludge according to size and a blade assembly passing through at least a portion of the first mesh, the first filter having a first region and a second region with the first mesh placed therebetween; a first flow path mounted in the first region to allow the sludge to flow into the first filter therethrough; a second flow path mounted in the second region to receive an effluent having passed through the first filter; a third flow path connected to the second flow path to discharge the effluent from the fine particle separating apparatus therethrough; a fourth flow path connected to one side of the second flow path and mounted in the second region to allow at least a portion of the effluent flowing into the second flow path to flow into the first filter therethrough; a fifth flow path mounted in the first region to receive the effluent discharged from the fourth flow and having passed through the first filter; a reservoir receiving the effluent discharged from the fifth flow path; and a first pump creating a flow of the effluent, wherein at least portion of the blade assembly is rotatably mounted on a surface of the first mesh.

In accordance with a further aspect of the present invention, a fine particle separating apparatus includes: a first filter including a first mesh separating fine particles contained in sludge according to size, the first filter having a first region and a second region with the first mesh placed therebetween; a first flow path mounted in the first region to allow the sludge to flow into the first filter therethrough; a sixth flow path mounted at both ends thereof in the second region to receive the effluent having passed through the first filter and to allow the effluent to flow back into the first filter therethrough; a fifth flow path mounted in the first region to receive the effluent discharged from the sixth flow path and having passed through the first filter; a reservoir receiving the effluent discharged from the fifth flow path; and a first pump creating a flow of the effluent, wherein the first mesh is rotatably mounted on the first filter.

In accordance with yet another aspect of the present invention, a fine particle separating apparatus includes: a first filter including a first mesh separating fine particles contained in sludge according to size and a blade assembly passing through at least a portion of the first mesh, the first filter having a first region and a second region with the first mesh placed therebetween; a first flow path mounted in the first region to allow the sludge to flow into the first filter therethrough; a sixth flow path mounted at both ends thereof in the second region to receive the effluent having passed through the first filter and to allow the effluent to flow back into the first filter therethrough; a fifth flow path mounted in the first region and adapted to receive the effluent discharged from the sixth flow path and having passed through the first filter; a reservoir receiving the effluent discharged from the fifth flow path; and a first pump creating a flow of the effluent, wherein at least portion of the blade assembly is rotatably mounted on a surface of the first mesh.

Advantageous Effects

The present invention provides a fine particle separating apparatus that includes a filter including a rotary mesh and having two regions with the mesh placed therebetween, in which the two regions are provided with a flow path allowing an effluent to flow into the filter therethrough and a flow path receiving the effluent having passed through the filter, respectively, thereby preventing the mesh from being clogged by fine particles and thus allowing continuous operation without interruption for cleaning purposes.

In addition, the present invention provides a fine particle separating apparatus that includes a filter including a mesh and a blade assembly, at least a portion of which is rotatably mounted on the mesh, the filter having two regions with the mesh placed therebetween, in which the two regions are provided with a flow path allowing an effluent to flow into the filter therethrough and a flow path receiving the effluent having passed through the filter, respectively, thereby preventing the mesh from being clogged by fine particles and thus allowing continuous operation without interruption for cleaning purposes.

BRIEF DESCRIPTION OF THE SEVERAL VIEWS OF THE DRAWINGS

FIG. 1 is a diagram of a fine particle separating apparatus according to one embodiment of the present invention.

FIG. 2 to FIG. 5 are exploded perspective views of a first filter according to one embodiment of the present invention.

FIG. 6 and FIG. 7 are views of a housing of the first filter according to one embodiment of the present invention.

FIG. 8 to FIG. 15 are diagrams of fine particle separating apparatuses according to other embodiments of the present invention.

FIG. 16 is a view showing exemplary use of the fine particle separating apparatus according to one embodiment of the present invention.

FIG. 17 to FIG. 19 are diagrams of fine particle separating apparatuses according to yet other embodiments of the present invention.

FIG. 20 to FIG. 22 are diagrams of fine particle separating apparatuses according to yet other embodiments of the present invention.

FIG. 23 is a diagram of a fine particle separating apparatus according to yet another embodiment of the present invention.

DETAILED DESCRIPTION

It should be understood that the present invention may be embodied in different ways and is not limited to the following embodiments, which are provided for complete disclosure and thorough understanding of the present invention by those skilled in the art.

It will be understood that when an element such as a layer, film, region or substrate is referred to as being placed "above (or below)" or "on (or under)" another element, it can be directly placed on the other element, or intervening layer(s) may also be present. Herein, spatially relative terms such as "upper" and "lower" are defined with reference to the accompanying drawings. Thus, it will be understood that the term "upper surface" can be used interchangeably with the term "lower surface", according to a reference orientation.

Like components will be denoted by like reference numerals throughout the specification. As used herein, the singular forms, "a" and "an" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

As used herein, the term "fine particles" may refer to not only microorganisms such as algae, fungi, yeast, and bacteria, but also particles that can be filtered by a first filter 100, 200, 300 or 400 according to one embodiment of the present invention, such as sand, precious metals, and the like on a river bed.

As used herein, the term "effluent" is not limited to an effluent passing through a specific flow path, and may refer to any fluid that passes through second to seventh flow paths 12 to 17 after sludge containing fine particles having flowed into the first filter 100, 200, 300 or 400 through a first flow path 11 passes through the first filter 100, 200, 300 or 400.

As used herein, the term "first filter" may refer to a filter on which the first flow path 11, the second flow path 12, the fourth flow path 14, and the fifth flow path 15 are all mounted, or a filter on which the first flow path 11, the fifth flow path 15, and the sixth flow path 16 are all mounted.

As used herein, the term "reservoir" is a place into which an effluent having flowed into the first filter 100, 200, 300 or 400 through the first flow path 11 flows through the fifth flow path 15, and may refer to a separate storage space or may refer to a river, the sea, or the ground.

Hereinafter, exemplary embodiments of the present invention will be described in detail with reference to the accompanying drawings.

In accordance with one embodiment of the present invention, there is provided a fine particle separating apparatus including: a first filter including a first mesh separating fine particles contained in sludge according to size, the first filter having a first region and a second region with the first mesh placed therebetween; a first flow path mounted in the first region to allow the sludge to flow into the first filter therethrough; a second flow path mounted in the second region to receive an effluent having passed through the first filter; a third flow path connected to the second flow path to discharge the effluent from the fine particle separating apparatus therethrough; a fourth flow path connected to one side of the second flow path and mounted in the second region to allow at least a portion of the effluent flowing into the second flow path to flow into the first filter therethrough; a fifth flow path mounted in the first region to receive the effluent discharged from the fourth flow and having passed through the first filter; a reservoir receiving the effluent discharged from the fifth flow path; and a first pump creating a flow of the effluent, wherein the first mesh is rotatably mounted on the first filter.

In accordance with another embodiment of the present invention, there is provided a fine particle separating apparatus including: a first filter including a first mesh separating fine particles contained in sludge according to size and a blade assembly rotatably mounted on a surface of the first mesh, the first filter having a first region and a second region with the first mesh placed therebetween; a first flow path mounted in the first region to allow the sludge to flow into the first filter therethrough; a second flow path mounted in the second region to receive an effluent having passed through the first filter; a third flow path connected to the second flow path to discharge the effluent from the fine particle separating apparatus therethrough; a fourth flow path connected to one side of the second flow path and mounted in the second region to allow at least a portion of the effluent flowing into the second flow path to flow into the first filter therethrough; a fifth flow path mounted in the first region to receive the effluent discharged from the fourth flow and having passed through the first filter; a reservoir receiving the effluent discharged from the fifth flow path; and a first pump creating a flow of the effluent, wherein the blade assembly includes a rotary blade.

Here, the first mesh may have a pore diameter of 40 μm to 1 mm.

In addition, the blade assembly may further include a cleaning brush attached to one side of the blade, wherein the cleaning brush may be rotated on the surface of the first mesh upon rotation of the blade.

In addition, a first flow path connection provided to the first region to allow the first flow path to be connected thereto may have a larger area than a fourth flow path connection provided to the second region to allow the fourth flow path to be connected thereto.

For example, the first pump may be disposed on at least one of the first to fifth flow paths.

Here, the first pump may be disposed on at least a portion of the second flow path.

Here, the fine particle separating apparatus may further include: a second pump disposed on at least a portion of the fourth flow path.

Here, the fine particle separating apparatus may further include: a second pump disposed on at least a portion of the fifth flow path.

In addition, the second flow path may be provided with a sample collection valve to perform component analysis on the fine particles in the sludge flowing into the fine particle separating apparatus through the first flow path.

In addition, the third flow path may be provided with a sample collection valve to perform component analysis on the fine particles discharged from the fine particle separating apparatus.

For example, the fine particle separating apparatus may further include: a second filter disposed at a side of the second flow path to which the third flow path is connected, wherein the second filter may include a second mesh having a pore diameter of 40 μm or less.

Here, the second filter may further include a blade assembly, at least a portion of which is rotatably mounted on a surface of the second mesh.

Here, the fine particle separating apparatus may further include: a detention tank storing the effluent discharged from the second flow path, wherein the effluent may be allowed to flow into the third flow path or the fourth flow path from the detention tank Here, the fine particle separating apparatus may further include: a third filter disposed at an entrance of the third flow path to which the detention tank is connected, wherein the third filter may include a third mesh having a pore diameter of 40 μm or less.

Here, the third filter may further include a blade assembly, at least a portion of which is rotatably mounted on a surface of the third mesh.

For example, the first filter may further include a blade assembly secured to a surface of the first mesh.

In addition, fine particles contained in the sludge flowing into the fine particle separating apparatus through the first flow path and having failed to pass through the first mesh may be forced to flow into the reservoir by hydraulic pressure of the effluent flowing into the first filter through the fourth flow path.

Here, the fine particles may include a colony of algae.

Here, the algae may include at least one selected from the group consisting of *Microcystis, Anabaena, Oscillatoria*, and *Aphanizomenon*.

The reservoir may include a fourth mesh having a pore diameter of 1 μm to 40 μm such that the colony of algae is filtered out through the fourth mesh and purified water is discharged from the reservoir.

In accordance with a further embodiment of the present invention, there is provided a fine particle separating system including the fine particle separating apparatus set forth above.

Here, fine particles contained in the sludge flowing into the fine particle separating apparatus through the first flow path and having failed to pass through the first mesh may be forced to flow into the reservoir by hydraulic pressure of the effluent flowing into the first filter through the fourth flow path.

In accordance with yet another embodiment of the present invention, there is provided a fine particle separating apparatus including: a first filter including a first mesh separating fine particles contained in sludge according to size, the first filter having a first region and a second region with the first mesh placed therebetween; a first flow path mounted in the first region to allow the sludge to flow into the first filter therethrough; a sixth flow path mounted at both ends thereof in the second region to receive the effluent having passed through the first filter and to allow the effluent to flow back into the first filter therethrough; a fifth flow path mounted in the first region to receive the effluent discharged from the sixth flow path and having passed through the first filter; a reservoir receiving the effluent discharged from the fifth flow path; and a first pump creating a flow of the effluent, wherein the first mesh is rotatably mounted on the first filter.

In accordance with yet another embodiment of the present invention, there is provided a fine particle separating apparatus including: a first filter including a first mesh separating fine particles contained in sludge according to size and a blade assembly rotatably mounted on a surface of the first mesh, the first filter having a first region and a second region with the first mesh placed therebetween; a first flow path mounted in the first region to allow the sludge to flow into the first filter therethrough; a sixth flow path mounted at both ends thereof in the second region to receive the effluent having passed through the first filter and to allow the effluent to flow back into the first filter therethrough; a fifth flow path mounted in the first region and adapted to receive the effluent discharged from the sixth flow path and having passed through the first filter; a reservoir receiving the effluent discharged from the fifth flow path; and a first pump creating a flow of the effluent, wherein the blade assembly includes a rotary blade.

Here, the reservoir may include: a first reservoir storing the effluent discharged from the fifth flow path; and a second reservoir storing the effluent with the fine particles separated therefrom in the first reservoir, wherein the fine particle separating apparatus may further include; a fourth filter separating the fine particles contained in the first reservoir according to size.

Here, the fine particle separating apparatus may further include: a seventh flow path adapted to discharge the effluent from the first reservoir to the second reservoir therethrough.

Here, the fine particle separating apparatus may further include: a fourth pump mounted on at least a portion of the seventh flow path to create a flow of the effluent.

In addition, the fine particle separating apparatus set forth above may further include: a separation tank connected to the third flow path to separate and store particles having passed through the first mesh.

Here, the fine particle separating apparatus may further include: a sixth filter provided to the separation tank, wherein the sixth filter may include a sixth mesh having a pore diameter of 10 μm or less.

In addition, the fine particle separating apparatus set forth above may further include: a fifth filter provided to the reservoir, wherein the fifth filter may include a fifth mesh having a pore diameter not allowing passage of particles having failed to pass through the first mesh.

FIG. 1 is a diagram of a fine particle separating apparatus according to one exemplary embodiment of the present invention.

Referring to FIG. 1, the fine particle separating apparatus includes a first flow path 11, a first filter 100, a second flow path 12, a third flow path 13, a fourth flow path 14, a fifth flow path 15, a reservoir 1, and a first pump 10.

The first flow path 11 allows sludge containing fine particles to flow into the first filter 100, 200, 300 or 400 therethrough, and may be connected at one end thereof to the first region 180*a*, 280*a*, 380*a*, 480*a*, 580*a* or 680*a* of the first filter 100, 200, 300 or 400. Here, the first flow path 11 may be connected to a separate reactor, or may receive an effluent directly from a river or the sea.

The first filter 100, 200, 300 or 400 includes a housing 110, 510 or 610 including a first mesh 120 or 220 separating the fine particles contained in the sludge, in which the housing has the first region 180*a*, 280*a*, 380*a*, 480*a*, 580*a* or 680*a* and a second region 180*b*, 280*b*, 380*b*, 480*b*, 580*b* or 680*b* with the first mesh 120 or 220 placed therebetween. Details of the first filter 100, 200, 300 or 400 will be described further below.

The second flow path 12 is a place into which the effluent having passed through the first filter 100, 200, 300 or 400 flows, and may be connected at one end thereof to the second region 180*b*, 280*b*, 380*b*, 480*b*, 580*b* or 680*b* of the first filter 100, 200, 300 or 400. Here, the second flow path 12 may be connected to: the third flow path 13 adapted to discharge the effluent from the fine particle separating apparatus therethrough; and the fourth flow path 14 adapted to return the effluent to the first filter 100, 200, 300 or 400 therethrough.

The third flow path 13 allows the effluent having passed through the first filter 100, 200, 300 or 400 to be discharged from the fine particle separating apparatus therethrough, in which the effluent may be discharged to a separate separation tank 5 or storage, or may be discharged directly to a river or the sea. The separation tank 5 will be described below with reference to FIG. 17.

The fourth flow path 14 is a place into which the effluent having passed through the first filter 100, 200, 300 or 400 flows through the second flow path 12, and may be connected to the second region 180*b*, 280*b*, 380*b*, 480*b*, 580*b* or 680*b* of the first filter 100, 200, 300 or 400. That is, the fourth flow path 14 may be connected to the region of the first filter 100, 200, 300 or 400 to which the second flow path 12 is connected, whereby hydraulic pressure can be applied from the fourth flow path 14 in an opposite direction to hydraulic pressure applied from the first flow path to the first mesh 120 or 220 of the first filter 100, 200, 300 or 400. In this way, fine particles clogging pores of the first mesh 120 or 220 can be discharged through the fifth flow path described below by hydraulic pressure of the effluent flowing into the first filter 100, 200, 300 or 400 through the fourth flow path 14.

The fifth flow path 15 is a place into which the effluent flowing into the first filter 100, 200, 300 or 400 through the fourth flow path 14 flows, and may be connected to the first region 180*a*, 280*a*, 380*a*, 480*a*, 580*a* or 680*a* of the first filter 100, 200, 300 or 400, whereby fine particles clogging the first mesh 120 or 220 can be separated from the first mesh 120 or 220 to flow into the fifth flow path 15 by hydraulic pressure of a fluid flowing through the fourth flow path 14, as described above.

The reservoir 1 is a place to which the effluent flowing into the fifth flow path 15 is discharged, and may store fine particles to be separated. For example, the reservoir 1 may store algae and the like. In addition, the reservoir 1 may contain chemicals capable of eliminating the algae through biological reaction or may be provided therein with a UV-C emission device to eliminate microorganisms that cause contamination in rivers and the like. The reservoir 1 may further include a first reservoir 3 and a second reservoir 4 described below.

The first pump 10 forces the effluent to flow into the first filter 100, 200, 300, or 400 through the first flow path 11, circulates the effluent through the fine particle separating apparatus, and provides hydraulic pressure to discharge the effluent from the first filter 100, 200, 300 or 400 through the fifth flow path 15 or to discharge the effluent from the fine particle separating apparatus through the third flow path 13. The first pump 10 may be disposed on at least one of the first to fifth flow paths 11 to 15, For example, the first pump may be disposed on at least a portion of the second flow path 12.

FIG. 2 and FIG. 3 are exploded perspective views of a first filter according to one embodiment of the present invention.

Referring to FIG. 2, the first filter 100 may include a housing 110, a first mesh cover 130, and a first mesh 120. The first mesh cover 130 may include a pair of first mesh covers facing each other with the first mesh 120 placed therebetween. Here, the first mesh cover may be provided with a first mesh cover cap 140 passing through a first mesh center groove 121 and a first mesh cover center groove 131, in which the first mesh cover cap 140 itself may be rotated or the first mesh 120 may be rotated on a surface of the first mesh cover cap 140. Here, the first mesh 120 may be provided in the form of a fan that is rotatable by hydraulic pressure of the effluent.

Referring to FIG. 3, the first filter 300 is provided with a separate power source capable of rotating the first mesh 220. For example, a first mesh center groove 221 shaped to be engaged with a gear of a motor 60 may be provided such that the first mesh 220 can be rotated by the motor 60.

That is, the fine particle separating apparatus according to the present invention can automatically rotate the first mesh 120 or 220 by hydraulic pressure of the effluent, or can rotate the first mesh 120 or 220 using the power source, whereby fine particles clogging the pores of the first mesh 120 or 220 can be effectively separated from the first mesh 120 or 220 and discharged to the reservoir through the fifth flow path 15.

FIG. 4 and FIG. 5 are exploded perspective views of a first filter according to another embodiment of the present invention.

The first filter 100 or 300 described above with reference to FIG. 2 and FIG. 3 includes the first mesh 120 or 220 configured to be rotatable, whereas the first filter 200 or 400 shown in FIG. 4 and FIG. 5 includes a blade assembly 150 or 250, at least a portion of which is rotatably mounted on a surface of the first mesh 120.

Referring to FIG. 4 and FIG. 5, the blade assembly 150 or 250 may include a first mesh cover cap 240 or 440 passing through the first mesh 120, a blade 160 or 260 disposed on the surface of the first mesh 120, and a cleaning brush 170 or 270 attached to one side of the blade 160 or 260, in which the cleaning brush 170 or 270 may be rotated on one surface of the first mesh 120 upon rotation of the blade 160 or 260. Here, the blade assembly 150 or 250 may be automatically rotated by hydraulic pressure, as shown in FIG. 4, or may be rotated by the motor 60, as shown in FIG. 5.

Although the shape of the blade 160 or 260 is not particularly restricted, the blade 160 or 260 may be an axial blade 160 or 260 in which sludge flow-in direction corresponds to sludge flow-out direction. Thus, the blade 160 or 260 may be rotated by hydraulic pressure applied from the first flow path 11 without using any separate power unit for rotating the blade 160 or 260, as shown in FIG. 4, or may be driven by the motor 60, as shown in FIG. 5. Referring to FIG. 4 and FIG. 5, the blade 160 or 260 may include one to four blades, without being limited thereto.

When the blade 160 or 260 is rotated, the cleaning brush 170 or 270 is rotated on the surface of the first mesh 120 to sweep fine particles out of the pores of the first mesh 120, whereby the swept fine particles can be discharged to the reservoir 1 by hydraulic pressure applied from the fourth flow path 14 after being drawn into a vortex inside the housing 110 of the first filter.

That is, with the blade assembly 150 or 250, at least a portion of which is rotated on the surface of the first mesh 120, the fine particle separating apparatus can effectively sweep fine particles out of the pores of the first mesh 120 and discharge the swept fine particles to the reservoir 1 through the fifth flow path 15 by hydraulic pressure applied from the fourth flow path 14 to the first filter 200 or 400.

The first filter 100, 200, 300 or 400 may further include a blade assembly 150 or 250 secured to the surface of the first mesh 120. That is, with the blade assembly 150 or 250 secured to the first mesh 120 which is configured to be rotatable, as described above with reference to FIGS. 2 to 3, the fine particle separating apparatus can more efficiently remove fine particles from the pores of the first mesh 120 and discharge the removed fine particles through the fifth flow path 15.

Here, the first mesh 120 or 220 may have a pore diameter of 40 μm to 1 mm. Examples of harmful blue-green algae, a main cause of water pollution, include *Microcystis, Anabaena, Oscillatoria*, and *Aphanizomenon*. It is known that *Microcystis* is composed of a spherical or elliptical single cell having a length of 4 μm to 8 μm, *Anabaena* is composed of a spherical or elliptical single cell having a length of 7 μm to 15 μm, *Oscillatoria* is composed of a cylindrical single cell having a length of 2.5 μm to 4 μm and a diameter of 4 μm to 6 μm, and *Aphanizomenon* is composed of a cylindrical single cell having a length of 5 μm to 15 μm and a diameter of 4 μm to 6 μm. However, these harmful blue-green algae can form a colony, which is known to have a size of at least 60 μm. Depending on underwater environments, colonies of blue-green algae having a size of greater than 8 mm are also found. Thus, the mesh 120 or 220 according to the present invention preferably has a pore diameter of 40 μm to 1 mm so as to prevent reduction in efficiency in separation of fine particles due to excessively large pore diameter while preventing hindrance to a flow of a fluid due to excessively small pore diameter.

FIG. 6 and FIG. 7 are views of a housing of the first filter according to one embodiment of the present invention.

Referring to FIG. 6 and FIG. 7, a first flow path connection 111 formed on the housing 510 or 610 to allow the first flow path to be connected thereto may have a larger area than a fourth flow path connection 114 formed on the housing 510 or 610 to allow the fourth flow path to be connected thereto. In this way, the fourth flow path 14 has a smaller flow area and thus a higher effluent pressure than the first flow path 11, whereby a continuous process for fine particle separating can be driven without supplying an excess of power to the pump.

FIG. 8 to FIG. 15 are diagrams of fine particle separating apparatuses according to other embodiments of the present invention.

Referring to FIG. 8 and FIG. 9, the fine particle separating apparatus may further include a sample collection valve 70. The sample collection valve 70 is provided to perform component analysis on fine particles in the effluent passing through the first filter 100, 200, 300 or 400, for example, to detect the presence of pollutants, the presence of algae colonies or the kind thereof, and the presence of elemental metals. For example, the sample collection valve 70 may be mounted on the second flow path 12 to perform component analysis on fine particles in the sludge flowing into the fine particle separating apparatus through the first flow path 11, or may be mounted on the third flow path 13 to perform component analysis on fine particles discharged from the fine particle separating apparatus.

Referring to FIG. 10, the fine particle separating apparatus may further include a second filter 40 disposed at a side of the second flow path 12 to which the third flow path 13 is connected, in which the second filter 40 may include a second mesh having a pore diameter of 40 μm or less, for example 1 μm to 40 μm, to prevent fine particles from being discharged from the fine particle separating apparatus. Here, the second mesh may have the same configuration as the first mesh 120 or 220 described above.

For example, the second mesh may have a pore diameter of 10 μm or less. Microalgae are known to have a size or length of 10 μm. Thus, purified water with microalgae removed therefrom can be discharged through the third flow path 13 by filtering out the microalgae through the second mesh. The fine particle separating apparatus according to the present invention allows relatively large particles in the effluent to be filtered out through the first mesh and discharged to the reservoir 1 while allowing the effluent to smoothly pass through the first filter 100, 200, 300, or 400. If the first mesh has a pore diameter of 10 μm or less, it is difficult for the effluent to smoothly pass through the first filter 100, 200, 300, or 400. Accordingly, the fine particle separating apparatus can more efficiently purify the effluent while maintaining a smooth flow of the effluent by disposing the first mesh having a pore diameter of 40 μm to 1 mm at the first filter 100, 200, 300 or 400 and setting the pore diameter of the second mesh to 10 μm or less.

In addition, the second filter 40 may include a blade assembly 150 or 250, at least a portion of which is rotatably mounted on a surface of the second mesh, in which the blade assembly 150 or 250 may include a first mesh cover cap 240 or 440, a blade 160 or 260, and a cleaning brush 170 or 270 attached to one side of the blade 160 or 260, as described above with reference to FIG. 4 and FIG. 5. Here, the cleaning brush 170 or 270 may be rotated on one surface of the first mesh 120 upon rotation of the blade 160 or 260.

In this way, the fine particle separating apparatus can prevent fine particles in the effluent passing through the first filter 100, 200, 300 or 400 from being discharged from the fine particle separating apparatus through the third flow path 13 while preventing the pores of the second mesh form being clogged by fine particles and the like with the help of the blade assembly 150 or 250 mounted on the second filter 40.

Referring to FIG. 11, the fine particle separating apparatus may further include a detention tank 2 storing the effluent discharged from the second flow path 12, in which the detention tank 2 may be connected to the third flow path 13 and the fourth flow path 14. In addition, referring to FIG. 12, the fine particle separating apparatus may further include a third filter 50 disposed at an entrance of the third flow path to which the detention tank 2 is connected, in which the third filter 50 may include a third mesh having a pore diameter of 40 μm or less, for example, 1 μm to 40 μm. For example, the third mesh may have a pore diameter of 10 μm or less, and may be configured as described above relating to the second mesh. Alternatively, the third filter 50 may have the same configuration as the first mesh 120 or 220 described above. Here, the third filter 50 may further include a blade assembly 150 or 250, at least a portion of which is rotatably mounted on a surface of the third mesh, in which the blade assembly 150 or 250 may be configured as described above with reference to FIG. 4 and FIG. 5.

In this way, the fine particle separating apparatus allows the effluent to be retained in the detention tank 2 before being discharged from the fine particle separating apparatus through the third flow path 13, whereby, among the fine particles passing through the first filter 100, 200, 300 or 400, fine particles which are not desirable to directly discharge from the fine particle separating apparatus can be precipitated or secondarily filtered out through the third filter 50, thereby improving efficiency in separating fine particles in the effluent flowing into the fine particle separating apparatus through the first flow path 11.

Referring to FIG. 13 to FIG. 15, the fine particle separating apparatus may further include an additional pump other than the first pump 10. Referring to FIG. 13 and FIG. 14, the fine particle separating apparatus may further include a second pump 20 disposed on the fourth flow path 14 and/or the fifth flow path 15 to increase hydraulic pressure applied to the first filter 100, 200, 300 or 400, thereby efficiently removing fine particles from the pores of the first mesh 120 or 220 and discharging the removed fine particles to the fifth flow path 15. Referring to FIG. 15, the fine particle separating apparatus may further include a third pump 30 disposed on the third flow path 13 to discharge the effluent with fine particles removed therefrom to a remote place outside the fine particle separating apparatus. In addition, referring to FIG. 23, the fine particle separating apparatus may further include a detention tank 2 storing the effluent discharged from the second flow path 12, in which the detention tank 2 may be connected to the third flow path 13 and the fourth flow path 14.

FIG. 16 is a view showing exemplary use of the fine particle separating apparatus according to one embodiment of the present invention.

The fine particle separating apparatus according to the present invention may be installed on the water or on the ground. The fine particle separating apparatus may be installed near an underwater environment in which algae colonies are formed, as shown in FIG. 16. The fine particle separating apparatus forces sludge to flow into the first filter 100, 200, 300 or 400 through the through the first flow path 11 using the first pump 10 and forces an effluent with algae colonies separated therefrom by the first filter 100, 200, 300 or 400 to flow into the second flow path 12 and to be discharged from the fine particle separating apparatus through the third flow path 13. At the same time, the fine particle separating apparatus forces the effluent flowing into the second flow path 12 to flow back into the first filter 100, 200, 300 or 400 through the fourth flow path 14, whereby the algae colonies flowing into the first filter 100, 200, 300 or 400 through the first flow path 11 and having clogged the pores of the first mesh 120 or 220 can be separated from the pores of the first mesh 120 or 220 and discharged to the fifth flow path 15. The effluent discharged to the fifth flow path 15 is then discharged to the reservoir 1, which, in turn, may allow the algae colonies to be directly removed from the effluent therein or may send the effluent to another place for removal of the algae colonies.

FIG. 17 is a diagram of a fine particle separating apparatus according to yet another embodiment of the present invention.

Referring to FIG. 17, the fine particle separating apparatus may further include a separation tank 5 connected to the third flow path 13. The separation tank 5 serves to allow particles having passed through the first mesh 120 or 220 to be separated without being returned to the reservoir 1. For example, upon collecting only fine sand from the sea or upon collecting precious metals in the sand along with the sand, the fine particle separating apparatus allows large particles a having failed to pass through the first mesh 120 or 220 to be discharged to the reservoir 1 and allows fine particles b having passed through the first mesh 120 or 220 to be separately sent to the separation tank 5, thereby efficiently separating the fine particles b without damage to the first pump 10 due to the large particles a.

FIG. 18 is a diagram of a fine particle separating apparatus according to yet another embodiment of the present invention.

The fine particle separating apparatus of FIG. 18 is substantially the same as the fine particle separating apparatus of FIG. 17 except for further including a sixth filter 82. The sixth filter 82 may include a sixth mesh. The sixth mesh may have a pore size of 40 μm or less, for example, 1 μm to 40 μm, for example, 10 μm or less. The sixth mesh may have the same configuration as the second mesh.

Recently, microalgae, which are commonly known to have a size or length of 10 μm, have been spotlighted as a biofuel material. However, typical technologies have difficulty in separating microalgae from various species of algae present in mixed form. However, the fine particle separating apparatus according to this embodiment allows algae having a large particle size to be filtered out through the first filter 100, 200, 300 or 400 and to be discharged to the reservoir 1, and allows microalgae to be sent to the separation tank 5 to be filtered out through the sixth filter 82.

FIG. 19 is a diagram of a fine particle separating apparatus according to yet another embodiment of the present invention.

Referring to FIG. 19, the fine particle separating apparatus according to this embodiment is substantially the same as the fine particle separating apparatuses described above with reference to FIG. 1 to FIG. 16 except for further including a fifth filter 81 provided to the reservoir 1. The fifth filter 81 serves to filter out particles contained in the reservoir 1 such that, for example, only purified water can be discharged from the fine particle separating apparatus. Here, the purified water may be discharged to a reactor connected to the first flow path 11 or to a separate reactor not connected to the first flow path 11, or may be discharged directly to a river or the sea. The fifth filter 81 may include a fifth mesh having a pore diameter not allowing passage of particles clogging the pores of the first mesh 120 or 220, for example, algae colonies. For example, the fifth mesh may have a pore diameter of less than 1 mm.

FIG. 20 to FIG. 22 are diagrams of fine particle separating apparatuses according to yet other embodiments of the present invention.

The fine particle separating apparatuses of FIG. 20 to FIG. 22 are substantially the same as the fine particle separating apparatus set forth above except that the third flow path 13 adapted to discharge the effluent from the fine particle separating apparatus therethrough is omitted and the effluent having passed through the first filter 100, 200, 300 or 400 is allowed to flow back into the first filter 100, 200, 300 or 400 through a sixth flow path 16.

Referring to FIG. 20 and FIG. 21, the fine particle separating apparatus may include a first flow path 11, a first filter 100, 200, 300, or 400, a sixth flow path 16, a fifth flow path 15, and a reservoir 1. The first filter 100, 200, 300 or 400 may be configured in the same manner as in the above embodiments. In addition, a first pump 10 as described above may be provided to the fine particle separating apparatus, in which the first pump may be positioned in the same manner as in the above embodiments. For example, the first pump 10 may be disposed on at least a portion of the sixth flow path 16, as shown in FIG. 20, or may be disposed on at least a portion of the fifth flow path 15, as shown in FIG. 21.

The reservoir 1 may include a first reservoir 3 storing the effluent discharged from the fifth flow path 15 and a second reservoir 4 storing the effluent with fine particles separated therefrom in the first reservoir 3. Although a way of connecting the first reservoir 3 to the second reservoir 4 is not particularly limited, the first reservoir 3 may be connected to the second reservoir 4 via a seventh flow path 17, as shown in FIG. 20 to FIG. 21.

The fine particle separating apparatus may further include a fourth filter 80 separating fine particles contained in the first reservoir 3 according to size, in which the fourth filter 80 may be mounted on a hole of the first reservoir 3 to which the seventh flow path is connected, may be mounted on at least a portion of the seventh flow path 17, or may be mounted on a hole of the second reservoir 4 to which the seventh flow path 17 is connected. The fourth filter 80 may include a fourth mesh having a pore diameter of 40 μm or less, for example, 1 μm to 40 μm, as described above, in which the fourth mesh may be configured as described above relating to the second mesh. In addition, the fine particle separating apparatus may further include a blade assembly 150 or 250 rotatably mounted on a surface of the fourth mesh. Alternatively, the fourth mesh may have the same configuration as the first mesh 120 or 220.

Referring to FIG. 22, the fine particle separating apparatus may further include a fourth pump 90 mounted on at least a portion of the seventh flow path 17 to create a flow of the effluent. That is, the fine particle separating apparatus can filter out fine particles in the first reservoir 3, for example, colonies of algae, through fourth filter 80 and can then discharge the purified effluent to the second reservoir 4. Here, the first reservoir 3 may be further provided with a separate fine particle removal device as described above.

Although the present invention has been described with reference to some embodiments in conjunction with the accompanying drawings, it should be understood that the foregoing embodiments are provided for illustration only and are not to be in any way construed as limiting the present invention. Therefore, the scope of the present invention should be defined by the appended claims and equivalents thereto.

LIST OF REFERENCE NUMERALS

1: Reservoir
2: Detention tank
3: First reservoir
4: Second reservoir
5: Separation tank
a: Large particles
b: Fine particles
10: First pump
20: Second pump
30: Third pump
40: Second filter
50: Third filter
60: Motor
70: Sample collection valve
80: Fourth filter
81: Fifth filter
82: Sixth filter
90: Fourth pump
11: First flow path
12: Second flow path
13: Third flow path
14: Fourth flow path
15: Fifth flow path
16: Sixth flow path
17: Seventh flow path
100, 200, 300, 400: First filter
110, 510, 610: Housing
120, 220: First mesh
121, 221: First mesh center groove
130: First mesh cover
131: First mesh cover center groove
140, 240, 340, 440: First mesh cover cap
111: First flow path connection
112: Second flow path connection
114: Fourth flow path connection
115: Fifth flow pathconnection
150, 250: Blade assembly
160, 260: Blade
170, 270: Cleaning brush
180a, 280a, 380a, 480a, 580a, 680a: First region
180b, 280b, 380b, 480b, 580b, 680b: Second region

The invention claimed is:

1. A fine particle separating apparatus comprising:
a first filter comprising a first mesh configured to separate fine particles contained in sludge according to size, the first filter having a first region and a second region with the first mesh placed therebetween;
a first flow path mounted in the first region and configured to allow the sludge to flow therethrough into the first filter;
a second flow path mounted in the second region and configured to receive an effluent having passed through the first filter;
a third flow path connected to the second flow path and configured to discharge the effluent therethrough;
a fourth flow path connected to one side of the second flow path and mounted in the second region to allow at least a portion of the effluent flowing into the second flow path to flow therethrough into the first filter;
a fifth flow path mounted in the first region to receive the effluent discharged from the fourth flow path after the effluent passes through the first filter;
a reservoir receiving the effluent discharged from the fifth flow path; and
a first pump configured to create a flow of the effluent, wherein the first mesh is rotatably mounted on the first filter, and
wherein the separating apparatus is constructed such that fine particles contained in the sludge flowing through the first flow path that fail to pass through the first mesh are forced to flow into the reservoir by hydraulic pressure of the effluent flowing into the first filter through the fourth flow path.

2. The fine particle separating apparatus according to claim 1, wherein the first filter further comprises a blade assembly passing through at least a portion of the first mesh, wherein at least portion of the blade assembly is rotatably mounted on a surface of the first mesh.

3. The fine particle separating apparatus according to claim 2, wherein the blade assembly comprises a blade and a cleaning brush attached to one side of the blade, the cleaning brush configured to rotate on a surface of the first mesh upon rotation of the blade.

4. The fine particle separating apparatus according to claim 1, further comprising:
a first flow path connection in the first region of the first filter having a first area and being configured to be connected to the first flow path; and
a second flow path connection in the second region of the first filter having a second area and being configured to be connected to the fourth flow path, wherein the first area is greater than the second area.

5. The fine particle separating apparatus according to claim 4, further comprising:
a second pump disposed in at least a portion of one of the fourth or fifth flow paths.

6. The fine particle separating apparatus according to claim 1, wherein the second flow path or the third flow path further comprises a sample collection device configured to perform component analysis on the fine particles in the sludge.

7. The fine particle separating apparatus according to claim 1, further comprising:
a second filter disposed between the second flow path and the third flow path, the second filter comprising a second mesh having a pore diameter of 40 μm or less.

8. The fine particle separating apparatus according to claim 7, wherein the second filter further comprises a blade assembly, at least a portion of which is rotatably mounted on a surface of the second mesh.

9. The fine particle separating apparatus according to claim 1, further comprising:
a detention tank configured to store the effluent discharged from the third flow path, wherein the effluent flows into the third flow path or the fourth flow path from the detention tank; and
a third filter disposed at an entrance of the third flow path to which the detention tank is connected, the third filter comprising a third mesh having a pore diameter of 40 μm or less.

10. The fine particle separating apparatus according to claim 9, wherein the third filter further comprises a blade assembly, at least a portion of which is rotatably mounted on a surface of the third mesh.

11. The fine particle separating apparatus according to claim 1, wherein the reservoir comprises a second mesh having a pore diameter of 1 μm to 40 μm such that the fourth mesh is configured to filter out algae and separate purified water from the effluent for discharging from the reservoir.

12. The fine particle separating apparatus according to claim 1, further comprising:
a separation tank connected to the third flow path configured to separate and store particles passing through the first mesh.

13. The fine particle separating apparatus according to claim 12, further comprising:
a second filter provided at the separation tank and comprising a second mesh having a pore diameter of 10 μm or less.

14. The fine particle separating apparatus according to claim 1, further comprising:
a second filter provided at the reservoir and comprising a second mesh having a pore diameter configured to prevent passage of particles through the second mesh that failed to pass through the first mesh.

15. A fine particle separating apparatus comprising:
a first filter comprising a first mesh separating fine particles contained in sludge according to size, the first filter having a first region and a second region with the first mesh placed therebetween;
a first flow path mounted in the first region and configured to allow the sludge to flow therethrough into the first filter;
a second flow path mounted at both ends thereof in the second region configured to receive an effluent from the first filter and configured to allow the effluent to flow therethrough back into the first filter;
third flow path mounted in the first region configured to receive the effluent from the second flow path;
a reservoir receiving the effluent discharged from the third flow path; and
a first pump configured to create a flow of the effluent,
wherein the first mesh is rotatably mounted on the first filter, and
wherein the separating apparatus is constructed such that fine particles contained in the sludge flowing through the first flow path that fail to pass through the first mesh are forced to flow into the reservoir by hydraulic pressure of the effluent flowing into the first filter through the second flow path.

16. The fine particle separating apparatus of claim 15, wherein the first filter further comprises a blade assembly passing through at least a portion of the first mesh, wherein at least a portion of the blade assembly is rotatably mounted on a surface of the first mesh.

17. The fine particle separating apparatus according to claim 15, wherein the reservoir further comprises a first reservoir configured to store the effluent discharged from the third flow path and a second reservoir configured to store the effluent with the fine particles separated therefrom in the first reservoir, the fine particle separating apparatus further comprising:
a second filter configured to separate the fine particles contained in the first reservoir according to size.

18. The fine particle separating apparatus according to claim 17, further comprising:
a fourth flow path adapted to discharge the effluent from the first reservoir to the second reservoir therethrough.

19. The fine particle separating apparatus according to claim 18, further comprising:
a second pump mounted on at least a portion of the fourth flow path and configured to create a flow of the effluent.

* * * * *